United States Patent
Takai et al.

(10) Patent No.: US 6,207,621 B1
(45) Date of Patent: Mar. 27, 2001

(54) METHOD FOR PRODUCING A MEMBER HAVING A HIGH LUBRICATIVE SURFACE AND A MEMBER HAVING A HIGH LUBRICATIVE SURFACE

(75) Inventors: Osamu Takai, Nagoya; Atsushi Hozumi, Komaki; Hiroyuki Sugimura, Nagoya, all of (JP)

(73) Assignee: Nagoya University, Nagoya (JP)

( * ) Notice: Subject to any disclaimer, the term of this patent is extended or adjusted under 35 U.S.C. 154(b) by 0 days.

(21) Appl. No.: 09/515,837

(22) Filed: Feb. 29, 2000

(30) Foreign Application Priority Data

Aug. 27, 1999 (JP) .................................................. 11-241654

(51) Int. Cl.[7] ............................ C10M 139/04; B05Q 3/06
(52) U.S. Cl. ........................ 508/206; 427/503; 427/536; 427/446; 106/38.22
(58) Field of Search ..................... 106/38.22; 508/206; 427/503, 536, 446

(56) References Cited

U.S. PATENT DOCUMENTS

| 5,266,222 | * | 11/1993 | Willis et al. | 508/206 |
| 5,324,548 | * | 6/1994 | Ogawa et al. | 427/515 |
| 5,587,209 | * | 12/1996 | Soga et al. | 427/503 |

* cited by examiner

*Primary Examiner*—Jacqueline V. Howard
(74) *Attorney, Agent, or Firm*—Stevens, Davis, Miller & Mosher, LLP

(57) ABSTRACT

A surface of a given base material is hydrophilized by irradiating, for example, a vacuum ultraviolet light to itself. Then, on the surface is formed a monomolecular film made of a fluoroalkylsilane preferably having at least one of a long fluoroalkyl-chain and a long alkyl-chain which preferably have lengths of not less than 1 nm. Then, the base material and the monocular film are thermally treated and thereby a member having a high lubricative surface can be obtained which has strong couplings between the base material and the molecular film through a dehydrating condensation reaction.

12 Claims, No Drawings

METHOD FOR PRODUCING A MEMBER HAVING A HIGH LUBRICATIVE SURFACE AND A MEMBER HAVING A HIGH LUBRICATIVE SURFACE

BACKGROUND OF THE INVENTION

1. Field of the Invention

This invention relates a method for producing a member having a high lubricative surface and a member having a high lubricative surface, and more particularly the same method and the same member preferably usable for metallic molds, magnetic heads, magnetic tapes, hard disks, floppy disks, pistons, products for micromachine, etc.

2. Description of the Prior Art

As a typical member having a high lubricative surface, there is a member comprising a given base material and a polytetrafluoroethylene (PTFE) material fixed on a surface of the base material. The PTFE material has a so high lubrication that the member is generally used for pistons, piston-rings, drills, bolts, nuts, dices, etc.

In the fixing of the PTFE material onto the surface of the base material, dry-processes which are typically PVD methods such as plasma polymerization, sputtering, and vacuum deposition, wet-processes which are typically coating methods such as electroless plating, dispersion plating, and electrodeposition, and complex methods of these dry-processes and wet-processes are currently proposed and practically used.

It is also suggested that in the case that the member having the high lubricative surface is worn away and the lubrication of its surface is degraded, the worn parts of the member are embedded by re-coating and thereby the member is made have lubrication.

However, the PVD methods such as the plasma polymerization, etc. require vacuum chambers which are expensive and complicate in operation. Accordingly, the production costs and the equipment costs are increased.

The wet-processes which are typically coating methods such as electroless plating, etc. require high temperature firing and long time treatment. Thus, the wet-processes restrict inevitably the sort of base material to be treated.

Even the base material usable for the wet-processes requires the optimum process for itself because the treatment such as firing for the base material is performed in a temperature range near its heat-resistant temperature. The fixing of the PTFE material onto a variety of base material requires vast equipment, resulting in the increase of the cost of the member having the high lubricative surface.

Moreover, large amounts of water and organic solvent are used in the wet-processes, which is not favorable with respect to the environment.

The PTFE material is needed to be produced from an expensive fluorine-based compound as its raw material. Thus, even if the above producing method is improved, the cost-increase of the member due to the producing of the PTFE material is not removed finally.

Moreover, even the above re-coating forms crater-like steps on the surface of the member, so that it has difficulty re-forming the surface uniformly flat and smooth. Thus, it is very difficult to give high lubrication to the worn surface of the member.

SUMMERY OF THE INVENTION

It is an object of the present invention to provide a method for producing a new member having a high lubricative surface without the above problems and different from the above conventional member and to provide the new member.

This invention relates to a method for producing a high lubricative surface comprising steps of:
preparing a base material,
hydrophilizing a surface of the base material, and
chemically reacting the surface of the base material with molecules of an organosilane having a long molecular chain and thereby forming on the surface of the base material a monomolecular film made of the organosilane having the long molecular chain.

This invention also relates to a member having a high lubricative surface comprising a base material and a monomolecular film made of an organosilane having a long molecular chain on a surface of the base material.

To iron out the above problems, this inventors has been intensely studied to develop a new member having a high lubricative surface, superceded from the lubricative member having the PTFE material on its surface.

As a result, they have found the following facts:

By irradiating, on a surface of a base material made of metal or ceramics, a vacuum ultraviolet light using an excimer lamp or a plasma such as an oxygen plasma, the surface is hydrophilized. Then, molecules of an organosilane such as a fluoroalkylsilane are deposited in a thickness of monomolucular film onto the surface. Just then, astonishingly, the substances constituting the base material are strongly coupled to the molecules of the organosilane through a dehydrating condensation reaction.

Moreover, it extremely decreases the surface free energy of the base material to coat the surface of the base material with a monomolecular film made of an organosilane having a long molecular chain such as a long perfluoroalkyl-chain or a long alkyl-chain and thereby the wearing characteristic of the base material is much improved.

According to the method for producing the member having the lubricative surface and the same member of the present invention, only the hydrophilizing treatment of the surface of the base material and the deposition of the molecules of the organosilane having the long molecular chain onto the surface of the base material enable the member having the surface with excellent wearing characteristic of extremely small friction force to be produced.

Thus, not only the problem of large cost in the dry-processes and the wet-processes is removed, but the restriction of the base material usable for the wet-processes is done. Moreover, although the expensive fluorine-based compound does not have to be used as the raw material of the PTFE material, the production cost of the member having the high lubricative surface can be much decreased.

Since the deposited molecules of the organosilane exists in monomolecular film and thereby has a thickness of molecular length-order, it can cover the surface of the base material without changing the shape of the surface. Thus, when the monomolecular film composed of the molecules of the organosilane is worn away, peeled off or destroyed and thereby the lubrication of the member having the monomolecular film on its surface is decreased, a new monomolecular film can be formed again uniformly flat and smooth by removing the damaged layer due to the wearing away, etc. through re-coating and thereafter forming the new monomolecular film, which is different from the conventional member having the PTFE material on its surface.

Accordingly, the member having the high lubricative surface can be semi-permanently used for metallic molds, magnetic heads, magnetic tapes, hard disks, floppy disks, pistons, products for micromachine.

DESCRIPTION OF THE PREFERRED EMBODIMENTS

The invention will be described in detail as follows: The method for producing the member having the high lubricative surface requires to chemically react the surface of the base material with the organosilane having the long molecular chain.

The length of the long molecular chain is not limited, on condition that the organosilane-monomolecular film is formed on the surface of the base material according to the present invention and thereby the surface free energy of the base material is decreased, resulting in improving the wearing characteristic. However, the lower limited value of the length of the long molecular chain is preferably 1 nm. Thereby, the covering ratio of the surface of the base material with the organosilane-monomolecular film can be much increased and the disorder of the molecular arrangement in the monomolecular film can be decreased, so that the wearing characteristic of the member can be much enhanced.

The upper limited value of the long molecular chain is not particularly limited, but preferably 5 nm, more preferably 2 nm. If the length of the long molecular chain is larger than the upper limited value, it becomes difficult to form the monomolecular film uniformly and thereby the surface free energy of the surface of the base material may not be decreased efficiently. Thus, the member having the high lubricative surface with excellent wearing characteristic may not be obtained.

The sort of the organosilane is not limited, on condition that it has the long molecular chain and the organosilane-monomolecular film with excellent wearing characteristic, having the long molecular chain, is formed on the surface of the base material.

However, the organosilane in the present invention is preferably a fluoroalkylsilane including at least one of the long perfluoroalkyl-chain and the long alkyl-chain. Such an organosilane includes, as organic functional group, only fluorocarbon or alkyl radical such as methyl radical which has low polarity. Thus, the interaction between an object to be contacted and the member having the high lubricative surface according to the present invention is decreased and thereby the member can have extremely high lubrication, resulting in remarkably enhancing the wearing characteristic.

As the above alkylsilane fluorine, are exemplified (3,3,3-trifluoropropyl) trichlorosilane, (3,3,3-trifluoropropyl) trimethoxysilane, (3,3,3 -trifluoropropyl) triethoxyysilane, (tridecafluoro-1,1,2,2-tetrahydrooctyl) trichlorosilane, (tridecafluoro-1,1,2,2-tetrahydrooctyl) trimethoxysilane, (tridecafluoro-1,1,2,2-tetrahydrooctyl) triethoxysilane, (heptadecafluoro-1,1,2,2-tetrahydrodecyl) trichlorosilane, (heptadecafluoro-1,1,2,2-tetrahydrodecyl) trimethoxysilane, (heptadecafluoro-1,1,2,2-tetrahydrodecyl) triethoxysilane, (3,3,4,4,5,5,6,6,6-nonafluorohexyl) trichlorosilane, (3,3,4,4, 5,5,6,6,6-nonafluorohexyl) trimethoxysilane, (3,3,4,4,5,5,6, 6,6-nonafluorohexyl) triethoxysilane.

The chemical reaction between the surface of the base material and the molecules of the organosilane is not particularly limited if they are strongly coupled. However, the chemical reaction is preferably dehydrating condensation reaction. That is, the substances constituting the base material are preferably reacted chemically with hydroxyls of the organosilane-molecules. Through the dehydrating condensation reaction, for example, the organosilane-molecules in the present invention is likely to strongly couple to another substance. Thus, the peeling off and the destruction, due to its wearing away, of the organosilane-monomolecular film formed on the surface of the base material can decrease effectively.

When the above fluoroalkylsilane is used as the organosilane and the following hydrophilizing treatment is employed, the coupling between the base material and the organosilane-monomolecular film generally becomes equal to a coupling in the dehydrating condensation reaction only by depositing the molecules of the organosilane onto the surface of the base material to form the monomolecular film thereon with a well known method such as a CVD method.

In such a case, the organosilane-monomolecular film is thermally treated at 150° C. for some three hours after it is formed on the surface of the base material, and thereby the couplings in the dehydrating condensation reaction can be generated between the base material and the organosilane-monomolecular film.

In the method for producing the member having the high lubricative surface according to the present invention, the hydrophilizing treatment of the surface of the base material before the chemical reaction of the surface with the organosilane is required.

The hydrophilizing treatment may be performed through every kind of means, but preferably through the irradiating to the surface of the base material at least one from a plasma, a vacuum ultraviolet light and an ozone gas. Such a hydrophilizing treatment can activate the surface regardless of the sort of the member to be treated to give it hydrophilization.

In irradiating the plasma, after the base material is set into a given vacuum chamber, the interior of the chamber is evacuated, into which an oxygen gas is preferably introduced. Then, a discharge is generated between the member and the chamber wall and the thus obtained oxygen plasma is exposed to the surface of the base material.

In irradiating the vacuum ultraviolet light, after the member is put into a given vacuum chamber, the interior of the chamber is evacuated. The vacuum ultraviolet light is introduced into the chamber from an external excimer lamp via the quartz window formed in the chamber wall and irradiated to the surface of the base material.

In irradiating the ozone gas, the member is set into a vacuum chamber as above-mentioned, and thereafter the ozone gas is directly irradiated to the surface of the base material from the gas nozzle provided on the chamber.

The member may be made of every sort of material such as a polymer material, a metallic material, a glass material, or a ceramic material.

EXAMPLES

This invention is concretely described on the examples.
(Experiment 1)

In this example, the base member was made of silicon and was put into a vacuum chamber as above-mentioned. Thereafter the interior of the chamber is evacuated and the surface of the base material was hydrophilized by irradiating to it a vacuum ultraviolet light having an intensity of 10 mW/cm$^3$ from an excimer lamp.

Then, on the hydrophilized surface of the base material, was formed the monomolecular film made of the fluoroalkylsilane having the long perfluoroalkyl-long chain of $(CF_3(CF_2)_7-)$(heptadecafluoro-1,1,2,2-tetrahydrodecyl) trimethoxysilane: under the trade name of "KBM7803", made by Shinetsu Kagaku Inc.). Then, the base material and the monomolecular film were thermally treated at 150° C.

for three hours and thereby they were chemically reacted to form chemical couplings therebetween, so that a member having a lubricative surface was produced.

(Experiment 2)

Except that the monomolecular film made of the fluoroalkylsilane (3,3,3-trifluoropropyl) trimethoxysilane: under the trade name of "TSL8257", made by Toshiba Silicone Inc.) having the long perfluoroalkyl-chain of $(CF_3(CF_2)_5-)$ instead of the $(CF_3(CF_2)_7-)$ was formed, a member having a lubricative surface was produced as in Experiment 1.

(Experiment 3)

In this experiment, a member having a lubricative surface was produced only by irradiating a vacuum ultraviolet light to the surface of the silicon-base material without forming an organosilane-monomolecular film on the surface, different from Experiment 1 and 2.

(Experiment 4)

Except that on the surface of the base material was formed the monomolecular film made of the fluoroalkylsilane (under the trade name of "TSL8262", made by Toshiba Silicone Inc.) having the short perfluoroalkyl-chain of the $(CF_3-)$ instead of the long fluoroalkyl-chain of the $(CF_3(CF_2)_7-)$, a member having a lubricative surface was produced as in Experiment 1.

Examples 1 and 2, Comparative Examples 1 and 2

A friction test was carried out to the member obtained in the above Experiment 1 to 4 with a probe having a spring constant of 18 N/m under the atmosphere (a temperature of 23° C., a humidity of 25%).

As a result of observation with a Lateral Force Microscope (LFM), friction coefficients of the members produced in Experiment 3 and 4 were not less than 0.2 which was large value, as opposed to that those of the members produced in Experiment 1 and 2 were not more than 0.1.

That is, the members in Experiment 1 and 2 having organosilane-monomolecular films with the long molecular chains on the surfaces of their base materials turned out to have excellent wearing characteristics and lubrications, respectively.

Moreover, even in the friction test under a large load of about 600N, the organosilane-monomolecular films in Experiment 1 and 2 were not destroyed and turned out to have excellent durabilities.

Although the present invention was described in detail with reference to the above examples, this invention is not limited to the above disclosure and every kind of variation and modification may be made without departing from the scope of the present invention.

As is explained above, according to the method for producing the member having the high lubricative surface and the same member in the present invention, the problem of large costs in the conventional dry-processes or the wet-processes can be avoided. Moreover, the restriction of the usable base material in the wet-processes can be removed. Furthermore, the use as a raw material of the expensive fluorine-based compound which is a raw material of the PTFE material as a typical high lubricative material is not required, resulting in the reduction of the production cost of the member having the high lubricative member.

Thus, the member having the high lubricative surface according to the present invention is a extremely potential member capable of replacing the surface-lubricative member having the PTFE material on its surface which is mainly used at present.

Moreover, the layer made of the organosilane formed on the surface of the member having the high lubricative surface of the present invention is a monomolecular film having a length of molecular length-order. Thus, when the layer is worn out, peeled off or destroyed and thereby the lubrication of the member is degraded, a new monomolecular film can be formed on the surface in uniformly flat and smooth by re-coating. Accordingly, the member having the high lubricative surface may be used semi-permanently for metallic moldings, magnetic heads, hard disks, floppy disks, pistons, products for micromachine, etc.

What is claimed is:

1. A method for producing a high lubricative surface comprising the steps of:
   preparing a base material,
   hydrophilizing a surface of the base material, and
   chemically reacting the surface of the base material with molecules of a fluoroalkylsilane that is 1–5 nm long, thereby forming on the surface of the base material a monomolecular film made of the fluoroalkylsilane.

2. The method for producing a high lubricative surface of claim 1, wherein the fluoroalkylsilane includes at least one of a member selected from the group consisting of a perfluoroalkyl-chain that is more than 1 nm long but less than 5 nm long and a alkyl-chain that is more than 1 nm long but less than 5 nm long.

3. The method for producing a high lubricative surface of claim 1, wherein the chemical reaction of the surface of the base material with the molecules of the fluoroalkylsilane is a dehydrating condensation reaction between the substances constituting the base material and the hydroxyls in the molecules of the fluoroalkylsilane.

4. The method for producing a high lubricative surface of claim 1, wherein the base material is silicon based.

5. The method for producing a high lubricative surface of claim 2, wherein the base material is silicon based.

6. The method for producing a high lubricative surface of claim 3, wherein the base material is silicon based.

7. The method for producing a high lubricative surface as defined in any one of claims 1, 2, 3, 4, 5 or 6, wherein the hydrophilizing treatment is performed by irradiating the surface of the base material with at least one of a member selected from the group consisting of plasma, an ultraviolet light and an ozone gas.

8. A member having a high lubricative surface comprising a base material and a monomolecular film comprising a fluroalkylsilane that is 1–5 nm long, wherein the member is produced by a process that includes hydrophilizing the base material.

9. The member having a high lubricative surface of claim 7, wherein the fluoroalkylsilane includes at least one of a member selected from the group consisting of a perfluoroalkyl-chain that is more than 1 nm long but less than 5 nm long and a alkyl-chain that is more than 1 nm long but less than 5 nm long.

10. The member having a high lubricative surface of claim 8, wherein the base material is silicon based.

11. The member having a high lubricative surface of claim 9, wherein the base material is silicon based.

12. The method for producing a high lubricative surface as defined in any one of claims 8 or 9, wherein the hydrophilizing treatment is performed by irradiating the surface of the base material with at least one of a member selected from the group consisting of plasma, an ultraviolet light and an ozone gas.

* * * * *